United States Patent
Takai et al.

(10) Patent No.: US 11,068,423 B2
(45) Date of Patent: *Jul. 20, 2021

(54) CONTROL DEVICE AND COMMUNICATION DEVICE

(71) Applicant: OMRON Corporation, Kyoto (JP)

(72) Inventors: Masaichi Takai, Ritto (JP); Yasuhiro Nishimura, Kyoto (JP)

(73) Assignee: OMRON Corporation, Kyoto (JP)

( * ) Notice: Subject to any disclaimer, the term of this patent is extended or adjusted under 35 U.S.C. 154(b) by 169 days.

This patent is subject to a terminal disclaimer.

(21) Appl. No.: 16/478,470

(22) PCT Filed: Nov. 20, 2017

(86) PCT No.: PCT/JP2017/041660
§ 371 (c)(1),
(2) Date: Jul. 16, 2019

(87) PCT Pub. No.: WO2018/146900
PCT Pub. Date: Aug. 16, 2018

(65) Prior Publication Data
US 2021/0133131 A1 May 6, 2021

(30) Foreign Application Priority Data
Feb. 7, 2017 (JP) .............................. JP2017-020411

(51) Int. Cl.
*G06F 13/28* (2006.01)
*G05B 19/05* (2006.01)
(52) U.S. Cl.
CPC ........... *G06F 13/28* (2013.01); *G05B 19/054* (2013.01); *G05B 2219/15056* (2013.01)
(58) Field of Classification Search
None
See application file for complete search history.

(56) References Cited

U.S. PATENT DOCUMENTS

| 7,089,344 B1 | 8/2006 | Rader et al. |
| 2003/0120835 A1* | 6/2003 | Kale ................. G06F 13/28 710/22 |
| 2007/0204073 A1 | 8/2007 | Chen et al. |

FOREIGN PATENT DOCUMENTS

| CN | 101482853 | 7/2009 |
| CN | 103593437 | 2/2014 |

(Continued)

OTHER PUBLICATIONS

"International Search Report (Form PCT/ISA/210) of PCT/JP2017/041660," dated Jan. 9, 2018, with English translation thereof, pp. 1-4.

(Continued)

*Primary Examiner* — Idriss N Alrobaye
*Assistant Examiner* — Dayton Lewis-Taylor
(74) *Attorney, Agent, or Firm* — JCIPRNET

(57) ABSTRACT

Provided is a control device that includes: a communication unit; one or more functional units; and a communication line connecting the communication unit and the one or the plurality of functional units. The communication unit includes: a computation processing unit in which a processor executes one or more tasks; a communication circuit which handles the transmission and reception of communication frames via the communication line; and a control circuit connected to the computation processing unit and the communication circuit. The control circuit includes: a first Direct Memory Access (DMA) core for accessing the computation processing unit; a second DMA core for accessing the communication circuit; and a controller which, in response to a trigger from the computation processing part, provides sequential commands to the first DMA core and the second DMA core in accordance with a predefined descriptor table.

4 Claims, 12 Drawing Sheets

(56) References Cited

FOREIGN PATENT DOCUMENTS

| | | |
|---|---|---|
| EP | 0803821 | 10/1997 |
| JP | H01309445 | 12/1989 |
| JP | H05252163 | 9/1993 |
| JP | 2001016258 | 1/2001 |
| JP | 2004110619 | 4/2004 |
| JP | 2004129287 | 4/2004 |
| JP | 2007027951 | 2/2007 |
| JP | 2010021866 | 1/2010 |

OTHER PUBLICATIONS

"Written Opinion of the International Searching Authority (Form PCT/ISA/237) of PCT/JP2017/041660," dated Jan. 9, 2018, with English translation thereof, pp. 1-8.
"Search Report of Europe Counterpart Application", dated Oct. 30, 2020, p. 1-p. 11.
"Office Action of China Counterpart Application", dated Feb. 26, 2021, with English translation thereof, p. 1-p. 14.

\* cited by examiner

CONTROL DEVICE AND COMMUNICATION DEVICE

CROSS-REFERENCE TO RELATED APPLICATION

This application is a 371 of international application of PCT application serial no. PCT/JP2017/041660, filed on Nov. 20, 2017, which claims the priority benefit of Japan application no. 2017-020411, filed on Feb. 7, 2017. The entirety of each of the abovementioned patent applications is hereby incorporated by reference herein and made a part of this specification.

BACKGROUND

Technical Field

The disclosure relates to a control device including one or a plurality of functional units and to a communication device configuring the control device.

Description of Related Art

Control devices such as programmable logic controllers (PLCs) are widely used as main components for realizing various factory automations (FAs). In such control devices, data is exchanged via communication lines between an arithmetic unit referred to as a central processing unit (CPU) unit and one or a plurality of functional units.

As a typical example of such data exchange, processing (generally referred to as "input output (IO) refresh processing") of transmitting the data collected by the functional unit (also referred to as "input data") to the arithmetic unit and transmitting the data calculated by the arithmetic unit (also referred to as "output data") to each functional unit is cyclically executed.

For example, Japanese Laid-Open No. 2010-021866 (Patent Document 1) discloses a communication system in which each slave that has received a trigger frame issued by a master transmits an IN frame after a set waiting time has elapsed. This communication system has a communication master including a communication interface (physical layer circuit) that actually performs data transmission and reception, an application specific integrated circuit (ASIC) that performs master-slave communication via the communication interface and handles transmission and reception of the IO data with the slave, and a processor that performs various controls.

RELATED ART

Patent Document

[Patent Document 1] Patent Document 1: Japanese Laid-Open No. 2010-021866

SUMMARY

Technical Problem

In the communication system described in Patent Document 1, when it is intended to improve the throughput of data transfer, for example, it is not only necessary to improve the processing capability of the processor and the master communication ASIC but also necessary to improve the data transfer capability between the master communication ASIC and the processor. However, it may not be easy to change the specification of the transmission path between the master communication ASIC and the processor.

An object of the disclosure is to solve the problems as described above, and the disclosure provides a new configuration that can improve the throughput of data transfer exchanged between a communication unit and one or a plurality of functional units.

Solution to the Problem

A control device according to an aspect of the disclosure includes a communication unit, one or a plurality of functional units, and a communication line that connects the communication unit and the one or the plurality of functional units. The communication unit includes an arithmetic processing part in which a processor executes one or a plurality of tasks, a communication circuit that handles transmission and reception of communication frames via the communication line, and a control circuit connected to the arithmetic processing part and the communication circuit. The control circuit includes a first direct memory access (DMA) core for accessing the arithmetic processing part, a second DMA core for accessing the communication circuit, and a controller that gives commands to the first DMA core and the second DMA core sequentially according to a predefined descriptor table in response to a trigger from the arithmetic processing part.

Preferably, the control circuit includes an activation unit configured to selectively activate a descriptor table designated from among a plurality of descriptor tables set with priorities different from each other in advance.

Preferably, the control circuit further includes an arbiter configured to arbitrate based on the priorities set in each of the descriptor tables when processings according to different descriptor tables are simultaneously requested.

Preferably, the plurality of descriptor tables are stored in at least one of a memory of the arithmetic processing part and a memory area of the control circuit.

Preferably, in the arithmetic processing part, a plurality of tasks set with priorities different from each other are executed, and each of the plurality of descriptor tables is stored in one of the memory of the arithmetic processing part and the memory area of the control circuit according to a priority of a corresponding task.

Preferably, the communication line has a plurality of channels independent of each other.

Preferably, the communication unit is configured to execute a first task of sending out, in a first cycle, a first communication frame for executing at least one of transmission of data collected by the functional units to the communication unit and transmission of data held by the communication unit to the functional units via a first channel among the plurality of channels and a second task of sending out, in a second cycle different from the first cycle, a second communication frame for executing at least one of transmission of the data collected by the functional units to the communication unit and transmission of the data held by the communication unit to the functional units via a second channel among the plurality of channels.

Preferably, each of the one or the plurality of functional units processes only any one of the communication frames in order to perform data exchange with the communication unit.

According to another aspect of the disclosure, a communication device connected to one or a plurality of functional units via a communication line is provided. The communication device includes an arithmetic processing part in which a processor executes one or a plurality of tasks, a communication circuit that handles transmission and reception of communication frames via the communication line, and a control circuit connected to the arithmetic processing part and the communication circuit. The control circuit includes a first direct memory access (DMA) core for accessing the arithmetic processing part, a second DMA core for accessing the communication circuit, and a controller that gives commands to the first DMA core and the second DMA core sequentially according to a predefined descriptor table in response to a trigger from the arithmetic processing part.

Effects

According to the disclosure, the throughput of data transfer exchanged between the communication unit and the one or the plurality of functional units can be improved.

DESCRIPTION OF THE EMBODIMENTS

Figure 1:
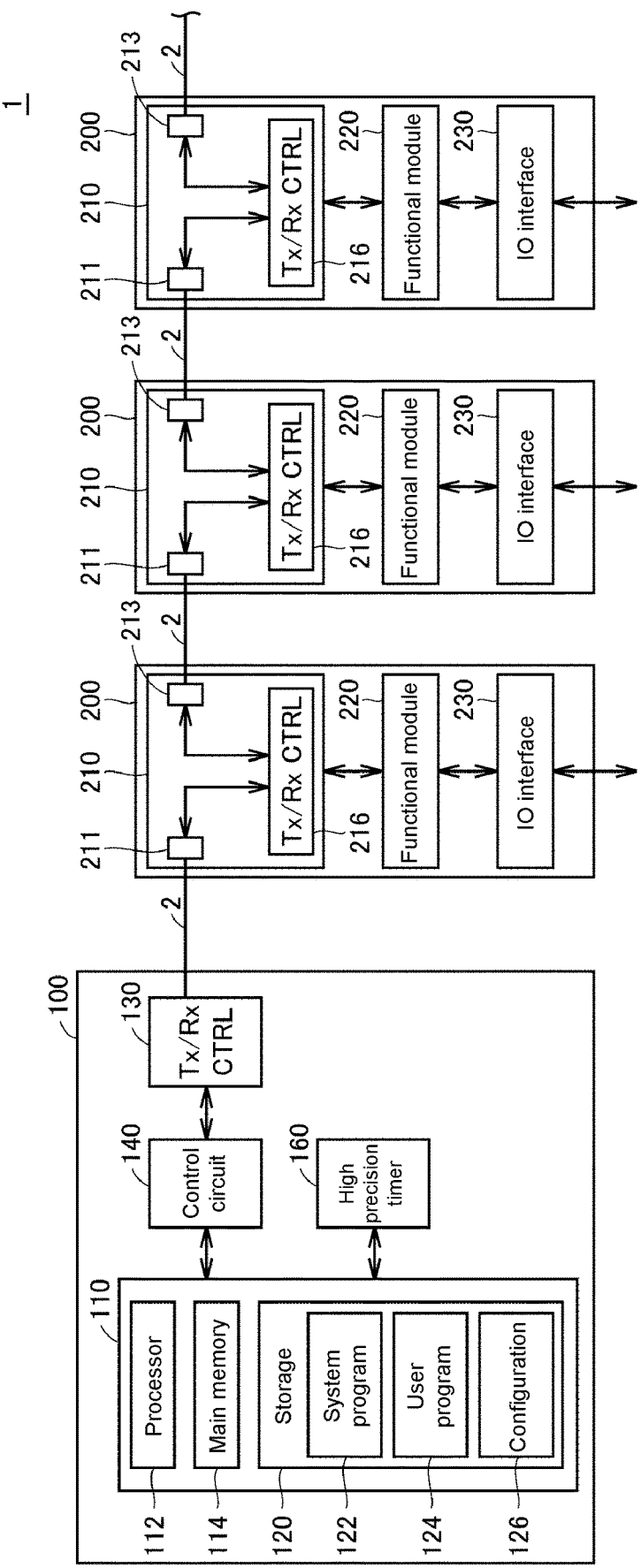
FIG. 1 is a schematic diagram showing a main configuration of a PLC according to Embodiment 1.

Embodiments of the disclosure will be described in detail below with reference to the drawings. Further, in the drawings, identical or corresponding parts are denoted by the same reference numerals and descriptions thereof will not be repeated.

In the following description, a programmable logic controller (PLC) will be described as a specific example to illustrate a typical example of a "control device", but the control device is not limited to the name of PLC, and the technical ideas disclosed in the specification are applicable to any control device.

1. Embodiment 1

<A. Device Configuration of a PLC>

First, a device configuration of a PLC according to Embodiment 1 will be described. FIG. 1 is a schematic diagram showing a main configuration of the PLC according to Embodiment 1. With reference to FIG. 1, a PLC 1 according to Embodiment 1 is typically configured by a CPU unit 100 and one or a plurality of functional units 200. The CPU unit 100 is an element configuring the PLC 1 and corresponds to an arithmetic unit that controls processing of the entire PLC 1. The functional units 200 provide various functions for realizing control of various machines or equipment by the PLC 1. The CPU unit 100 and the one or the plurality of functional units 200 are connected via a local bus 2 which is an example of a communication line. For example, a type of daisy chain configuration is adopted as the local bus 2.

In the configuration shown in FIG. 1, the CPU unit 100 also functions as a communication unit or a communication device. More specifically, the CPU unit 100 may function as a master communication unit that manages the entire communication in the local bus 2, and the CPU unit 100 may be configured to function as a slave communication unit with which each functional unit 200 performs communication under the management of the CPU unit 100. By adopting such a master/slave configuration, timing control and the like of communication frames transferred to the local bus 2 can be easily performed.

The CPU unit 100 includes an arithmetic processing part 110, a communication circuit 130, a control circuit 140, and a high precision timer 160. Further, the CPU unit including the arithmetic processing part 110 may be combined with a communication unit that provides the function of the communication circuit 130.

The arithmetic processing part 110 includes a processor 112, a main memory 114, and a storage 120. For convenience of description, only one processor 112 is shown in FIG. 1, but a plurality of processors may be mounted. In addition, each processor may have a plurality of cores. In the arithmetic processing part 110, the processor 112 cyclically executes one or a plurality of tasks. In the case where a plurality of tasks are executed in the arithmetic processing part 110, priorities different from each other may be set for the plurality of tasks.

The main memory 114 is configured by a dynamic random access memory (DRAM), a static random access memory (SRAM), or the like, and provides a work area necessary for the execution of programs by the processor 112.

The storage 120 is configured by a flash memory, a hard disk, or the like, and stores a system program 122, a user program 124, a configuration 126, and the like. The system program 122 includes an operating system (OS) and a library for executing the user program 124 in the processor 112. The system program 122 includes a task for cyclically executing processing (the IO refresh processing to described later) of transmitting field values (input data) collected by the functional units 200 to the CPU unit 100 and transmitting control instruction values (output data) calculated by the CPU unit 100 to the functional units 200. The user program 124 is created as desired according to machines or equipment to be controlled. The configuration 126 includes various setting values necessary for program execution in the CPU unit 100 and various setting values defining a network configuration.

The communication circuit 130 exchanges data with the one or the plurality of functional units 200 via the local bus 2 which is a communication line. That is, the communication circuit 130 handles transmission and reception of communication frames via the local bus 2 which is a communication line. More specifically, the communication circuit 130 is physically connected to the local bus 2, generates an electric signal in accordance with an instruction from the control circuit 140, and transmits it onto the local bus 2; in addition, the communication circuit 130 demodulates the electric signal generated on the local bus 2 and outputs it to the arithmetic processing part 110.

In this specification, the "IO refresh processing" refers to processing of executing at least one of transmission of the input data collected by the functional units 200 to the communication unit (the CPU unit 100 or a communication coupler unit 300 to be described later or the like) and transmission of the output data held by the communication unit to the functional units 200. That is, the name of "IO refresh processing" is for convenience of reference and may include the update processing of only one of the input data and the output data.

The control circuit 140 is connected to the arithmetic processing part 110 and the communication circuit 130 and has a function of mediating a request between the arithmetic processing part 110 and the communication circuit 130. For example, the control circuit 140 responds to a communication request from the processor 112 and gives an instruction to the communication circuit 130 to perform transmission or reception of data. As described later, the control circuit 140 is implemented with, for example, a function for speeding up data access, such as direct memory access (DMA) and the like.

At least the main part of the control circuit 140 may have a hard-wired configuration to realize faster processing than the processor 112. Typically, the control circuit 140 is realized with use of hardware logic. For example, the control circuit 140 may be implemented with use of a field-programmable gate array (FPGA), which is an example of a programmable logic device (PLD), an application specific integrated circuit (ASIC), which is an example of an integrated circuit (IC), or the like.

The high precision timer 160 is a type of clock for determining the timing between the CPU unit 100 and other units connected to the CPU unit 100, and is realized with use of a counter or the like that counts up a predetermined cycle.

The communication frames used in the IO refresh processing are transferred by cycling through the local bus 2. During a period in which the communication frames used in the IO refresh processing are not transferred, the communication frames may be message transferred between the CPU unit 100 and any functional unit 200 or between the plurality of functional units 200.

Any protocol can be adopted as a protocol for exchanging the data on the local bus 2. Furthermore, although the local bus 2 is illustrated as an example of the communication line, the disclosure is not limited thereto, and any fixed cycle network may be adopted. A known network such as EtherCAT (a registered trademark), EtherNet/IP (a registered trademark), DeviceNet (a registered trademark), CompoNet (a registered trademark) or the like may be adopted as such a fixed cycle network.

In the configuration shown in FIG. 1, for convenience of description, the configuration is shown in which the arithmetic processing part 110, the communication circuit 130 and the control circuit 140 are distinguished, but the disclosure is not limited thereto, and any implementation form can be adopted. For example, it may be configured by a System on Chip (SoC) in which all or part of the arithmetic processing part 110 and all or part of the communication circuit 130 are mounted on the same chip. Alternatively, an SoC in which the processor 112 of the arithmetic processing part 110 and the main functions of the control circuit 140 are mounted on the same chip may be used. Such an implementation form is appropriately selected in consideration of requested performance, cost, and the like.

The functional units 200 may typically include an I/O unit, a communication unit, a temperature adjustment unit, an identifier (ID) sensor unit, and the like.

For example, a digital input (DI) unit, a digital output (DO) unit, an analog input output (AI) unit, an analog output (AO) unit, a pulse catch input unit, a composite unit obtained by mixing a plurality of types, and the like may be used as the I/O unit.

The communication unit mediates the exchange of data with other PLCs, remote I/O devices, functional units, and the like, and, for example, may include a communication device and the like according to a protocol such as EtherCAT (a registered trademark), EtherNet/IP (a registered trademark), DeviceNet (a registered trademark), CompoNet (a registered trademark) and the like.

The temperature adjustment unit is a control device including an analog input function that acquires a temperature measurement value and the like, an analog output function that outputs a control instruction and the like, and a proportional integral differential (PID) control function. The ID sensor unit is a device that reads data in a non-contact way from a radio frequency identifier (RFID) and the like.

Each of the functional units 200 includes a communication processing part 210, a functional module 220, and an IO interface 230.

The functional module 220 is a part that executes main processing of each functional unit 200 and handles collection of field values (input data) from the machines, the equipment or the like to be controlled; output of control instruction values (output data) to the machines, the equipment or the like to be controlled; and the like.

The IO interface 230 is a circuit that mediates the exchange of signals with the machines, equipment or the like to be controlled.

The communication processing part 210 processes communication frames sequentially transferred on the local bus 2. More specifically, when the communication processing part 210 receives any communication frame via the local bus 2, the communication processing part 210 performs data writing and/or data reading on the received communication frame as needed. Thereafter, the communication processing part 210 transmits the communication frame to the functional unit 200 located next on the local bus 2. The communication processing part 210 provides such a frame relay function. Further, the communication processing part 210, for a communication frame that is not addressed to its own unit, may simply transfer the communication frame to the functional unit 200 located next.

More specifically, the communication processing part 210 includes transmission and reception ports 211 and 213 and a communication circuit 216. The transmission and reception ports 211 and 213 are interfaces physically connected to the local bus 2 and generate electric signals according to instructions from the communication circuit 216 and transmit them on the local bus 2. In addition, the transmission and reception ports 211 and 213 convert the electric signals generated on the local bus 2 into digital signals and output them to the communication circuit 216.

The communication circuit 216 performs data writing and/or data reading on a communication frame transferred on the local bus 2. The communication circuit 216 has independent circuits (not shown) corresponding to respective channels and can independently process communication frames respectively transferred on the respective channels.

<B. Fixed Cycle Tasks in the CPU Unit>

In the PLC 1 according to Embodiment 1, one or a plurality of fixed cycle tasks set with respective priorities are executed. Among such fixed cycle tasks, there is IO refresh processing as one of the tasks with the highest priority (hereinafter also referred to as a "primary fixed cycle task"). There are various tasks (hereinafter also referred to as "normal fixed cycle tasks") as tasks with priorities lower than the priority of the IO refresh processing. These tasks are to be repeatedly executed at respective preset constant cycles.

Figure 2:
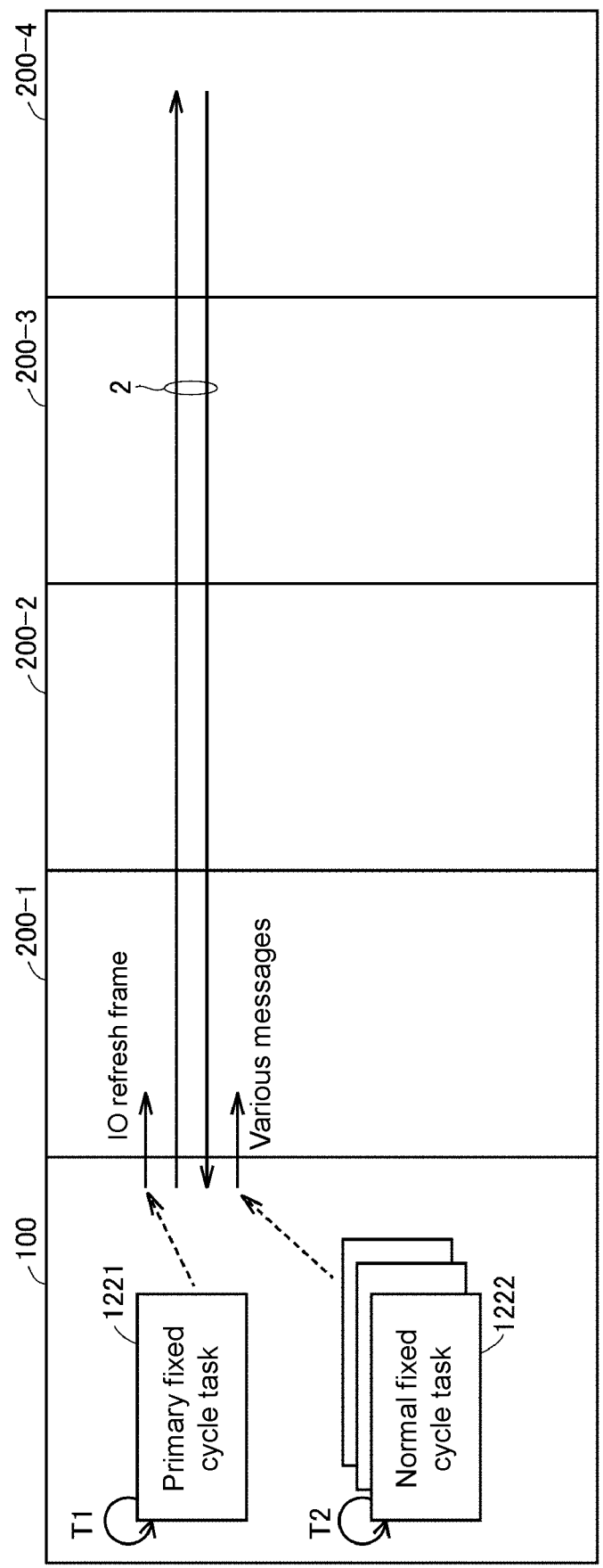
FIG. 2 is a schematic diagram for illustrating the execution of fixed cycle tasks in the PLC according to Embodiment 1.

FIG. 2 is a schematic diagram for illustrating the execution of fixed cycle tasks in the PLC 1 according to Embodiment 1. With reference to FIG. 2, in the CPU unit 100, a primary fixed cycle task 1221 for executing the IO refresh processing and the like is repeatedly executed at a constant cycle T1, and one or a plurality of normal fixed cycle tasks 1222 with priorities lower than that of the primary fixed cycle task 1221 are repeatedly executed at a constant cycle T2. The cycle T2 for repeatedly executing the normal fixed cycle tasks 1222 may be set to different values for each normal fixed cycle task 1222. Typically, the constant cycle T2 is set to a value longer than the constant cycle T1.

When the IO refresh processing is executed as the primary fixed cycle task 1221, the primary fixed cycle task 1221 repeatedly sends out an IO refresh frame for realizing the IO refresh onto the local bus 2 in every constant cycle T1.

Processing of transmitting various message frames to specific functional units 200 may be executed as the normal fixed cycle tasks 1222 in response to the establishment of any event or condition. That is, the communication circuit 130 (FIG. 1) may be activated for the normal fixed cycle tasks 1222 to send out a message frame onto the local bus 2 as an event or cyclically.

In the CPU unit 100 of the PLC 1 according to Embodiment 1, when an activation request is made to the communication circuit 130 from respective tasks having priorities different from each other, the control circuit 140 enables arbitration in consideration of the priority of each task. Hereinafter, a more detailed configuration of the control circuit 140 will be described.

<C. Control Circuit of the CPU Unit>

Figure 3:
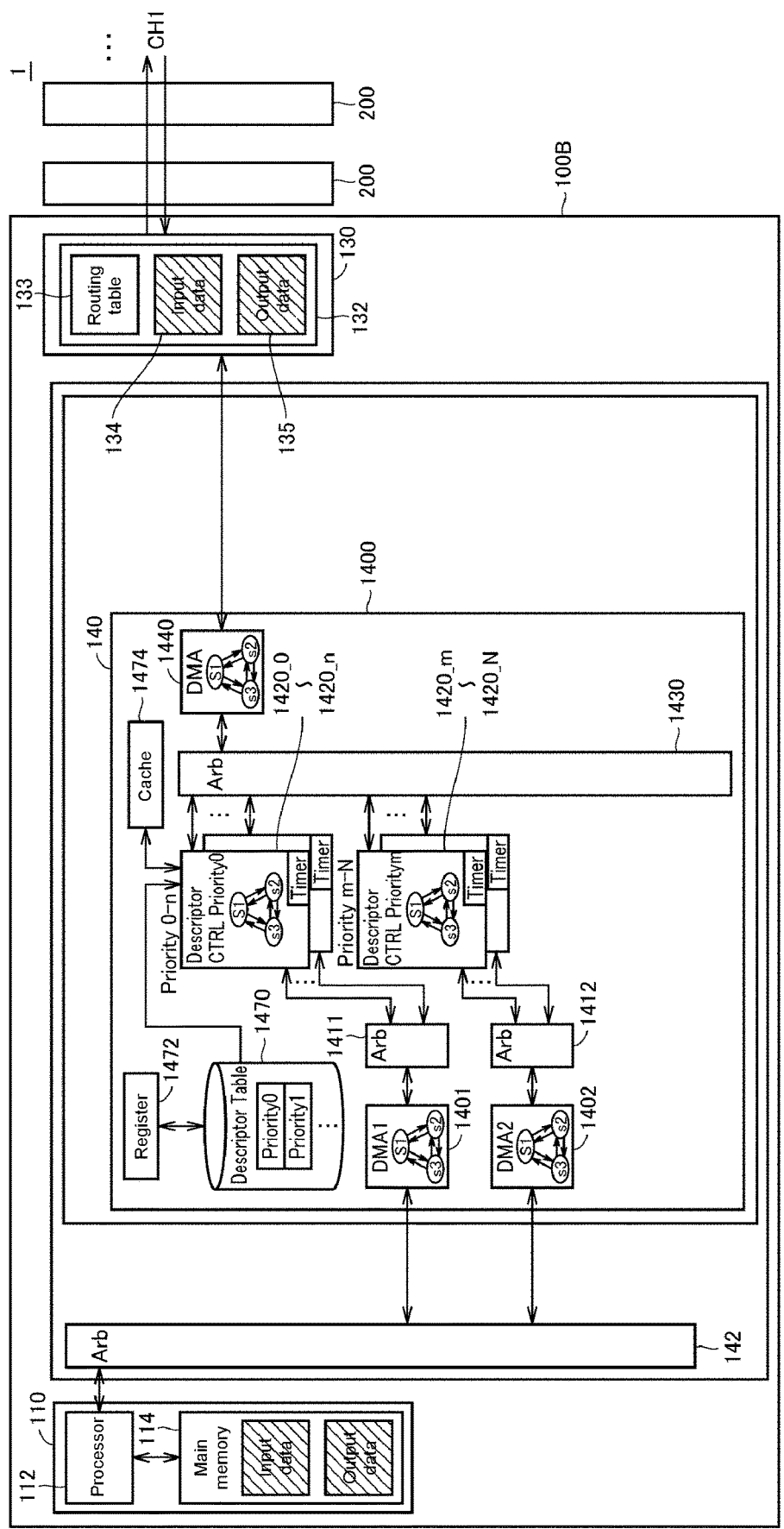
FIG. 3 is a schematic diagram showing a main configuration centering on the control circuit that configures the CPU unit of the PLC according to Embodiment 1.

FIG. 3 is a schematic diagram showing a main configuration centering on the control circuit 140 that configures the CPU unit 100 of the PLC 1 according to Embodiment 1. With reference to FIG. 3, the control circuit 140 uses DMA to speed up data transfer while reducing processing such as data access by the processor 112.

More specifically, the control circuit 140 includes a bus arbiter 142 and a processing engine 1400. The control circuit 140 can be implemented with use of any hardware.

The bus arbiter 142 is disposed on a bus connecting the processor 112 of the arithmetic processing part 110 and the processing engine 1400, and arbitrates according to a predetermined rule using priority and the like when a plurality of data access requests conflict.

The processing engine 1400 is a component that provides the main functions of the control circuit 140 and provides a function of proxying the data exchange between the arithmetic processing part 110 and the communication circuit 130.

The processing engine 1400 has a plurality of DMA cores set with priorities (also referred to as "priority") different from each other, and descriptor tables formed by one or a plurality of commands are given to the DMA cores, whereby the designated processing is executed. The descriptor tables are typically described in assembler or machine language. As described later, the priorities are set in the descriptor tables, whereby the DMA cores that process each descriptor table are determined. By using such DMA cores and descriptor tables set with priorities, the IO refresh processing repeatedly executed in the primary fixed cycle task 1221 and the IO refresh processing repeatedly executed in the normal fixed cycle tasks 1222 can be executed in parallel.

The priorities set in the descriptor tables are used in the management of the access right to the DMA cores 1401 and 1402 for data access to the arithmetic processing part 110; the access right to memories inside the processing engine 1400 such as a descriptor table storage part 1470, a descriptor activation register 1472 and a command cache 1474; the access right for activating the communication circuit 130; the access right to the communication circuit 130; and the like.

Specifically, the processing engine 1400 includes the DMA cores 1401, 1402 and 1440; bus arbiters 1411, 1412 and 1430; descriptor (also referred to as "Descriptor") controllers 1420_0 to 1420_N; the descriptor table storage part 1470; the descriptor activation register 1472; and the command cache 1474.

FIG. 3 shows, as an example, a configuration in which N levels of priorities can be set. N descriptor controllers 1420_0 to 1420_N (also collectively referred to as the "descriptor controllers 1420") are prepared corresponding to the N levels of priorities. Setting the priorities to N levels is an example, and the number of levels can be set as desired. In Embodiment 1, it is assumed that the priority "0" (priority0) is the highest priority, and the priority "N" (priorityN) is the lowest priority.

The DMA cores 1401 and 1402 handle access to the arithmetic processing part 110 (mainly, the main memory 114). In the DMA cores 1401 and 1402, three levels of priorities are set corresponding to the priorities of the descriptor controllers 1420. For example, the DMA core 1401 corresponds to the descriptor controllers 1420 with the priorities "0" to "n", and the DMA core 1402 corresponds to the descriptor controllers 1420 with the priorities "m" to "N".

Further, the two levels of priorities shown in FIG. 3 are an example, and the disclosure is not limited thereto. Any number of DMA cores may be adopted according to the access frequency and the like.

The processing engine 1400 includes arbiters that arbitrate based on the priorities set in each descriptor table when processings according to different descriptor tables are simultaneously requested.

More specifically, the bus arbiters 1411 and 1412 arbitrate command inputs to the DMA cores 1401 and 1402, respectively. That is, the bus arbiter 1411 arbitrates so that the command inputs from the descriptor controllers 1420_0 to 1420_$n$ to the DMA core 1401 do not conflict. The bus arbiter 1412 arbitrates so that the command inputs from the descriptor controllers 1420$m$ to 1420_N to the DMA core 1402 do not conflict.

The DMA core 1440 handles access to the communication circuit 130 (mainly, the buffer 132). The bus arbiter 1430 arbitrates command inputs to the DMA core 1440. That is, the bus arbiter 1430 arbitrates based on the priorities and the like set in the descriptor controllers 1420 as the command issuing sources so that the command inputs from the descriptor controllers 1420_0 to 1420_N to the DMA core 1440 do not conflict.

The descriptor table storage part 1470 stores one or a plurality of descriptor tables to be given to the DMA cores. Priorities different from each other are set in the respective descriptor tables stored in the descriptor table storage part 1470.

The descriptor activation register 1472 is formed by registers associated the respective descriptor tables. When any flag in the descriptor activation register 1472 is set, a descriptor corresponding to the set flag is given to the descriptor controllers 1420 set with the corresponding priority. Then, the descriptor controllers 1420 sequentially give the commands included in the given descriptor table to the designated DMA cores, whereby the processing described in the descriptor table is executed. As described above, the descriptor activation register 1472 is used as part of a function for selectively activating a descriptor table designated from among the plurality of descriptor tables set with priorities different from each other in advance.

The command cache 1474 temporarily stores one or a plurality of commands included in the designated descriptor table. The one or the plurality of commands stored in the command cache 1474 are sequentially given to the designated DMA cores, whereby the described processing is executed.

As described later, any command can be given to the DMA cores by combining the descriptor activation register 1472 with the descriptor table storage part 1470 or with the main memory 114 of the arithmetic processing part 110.

<D. Example of an Operation Procedure in the Control Circuit 140>

Figure 4:
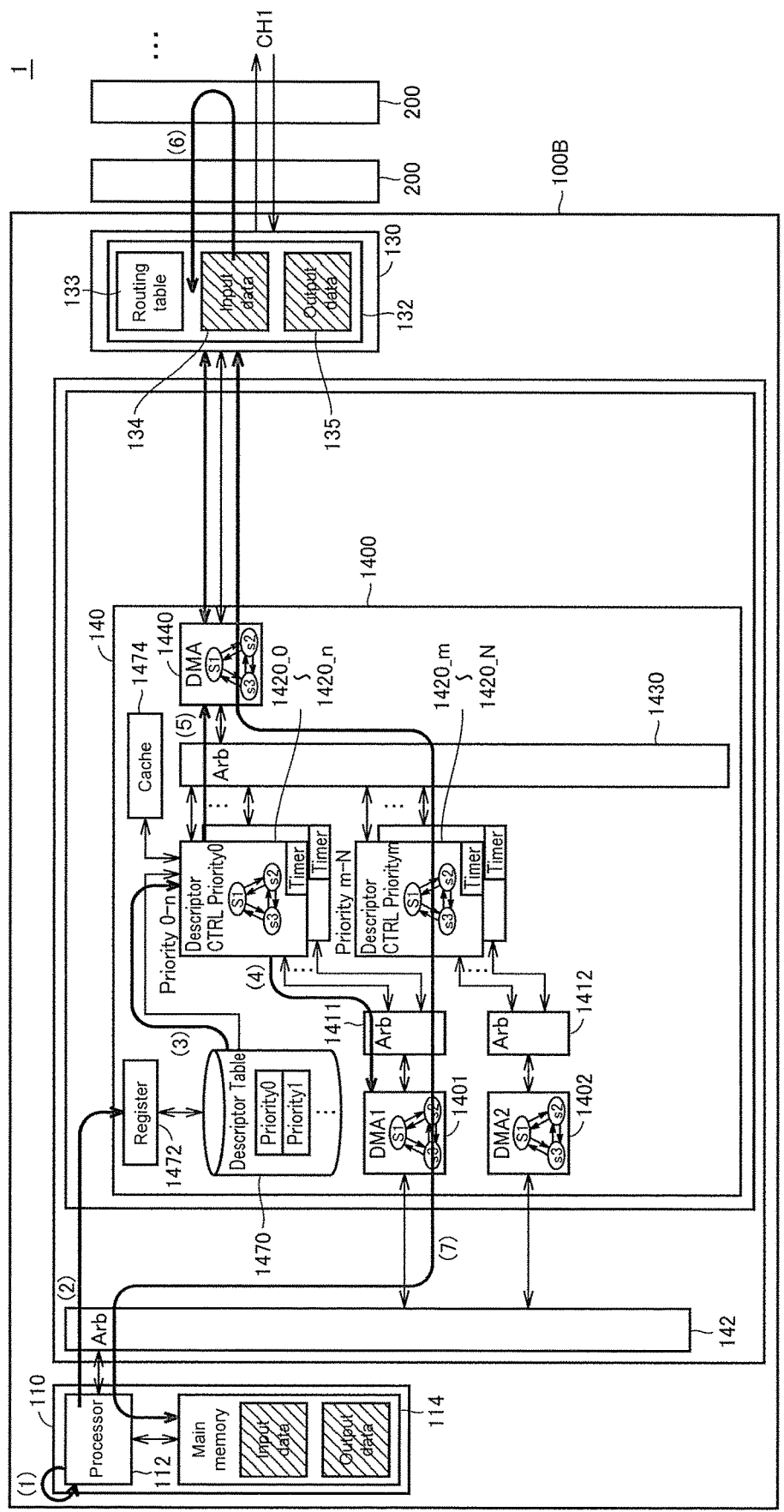
FIG. 4 is a schematic diagram showing an example of an operation procedure in the control circuit of the PLC according to Embodiment 1.

Next, an example of an operation procedure in the control circuit 140 which configures the CPU unit 100 shown in FIG. 3 will be described. FIG. 4 is a schematic diagram showing an example of an operation procedure in the control circuit 140 of the PLC 1 according to Embodiment 1. FIG. 4 shows, as an example, an example in which the IO refresh processing is executed mainly by the control circuit 140 in response to an activation request from the arithmetic processing part 110 to the communication circuit 130. Further, the timing of the activation request from the arithmetic processing part 110 to the communication circuit 130 is managed with high precision based on the value (count value) indicated by the high precision timer 160 (FIG. 1). The processor 112 of the arithmetic processing part 110 executes the system program 122 and the like, whereby the primary fixed cycle task 1221 that executes the IO refresh processing is executed. The input data and the output data are stored in the main memory 114 by the IO refresh processing, and each value is updated according to the IO refresh cycle. The communication circuit 130 includes a buffer 132 for storing input data 134 and output data 135 exchanged with use of communication frames on the local bus 2.

In the IO refresh processing, the control circuit 140 writes the input data 134 into the buffer 132 of the communication circuit 130 and reads the output data stored in the buffer 132 of the communication circuit 130. The buffer 132 of the communication circuit 130 may store a routing table 133 for determining to transfer a communication frame to a designated destination. Further, it is assumed that the descriptor table storage part 1470 stores the descriptor tables to which priorities are given in advance.

More specifically, with reference to FIG. 4, when the task execution cycle arrives and the primary fixed cycle task 1221 (or the normal fixed cycle tasks 1222) is executed ((1) in FIG. 4), the processor 112 of the arithmetic processing part 110 sets, among flags configuring the descriptor activation register 1472, a flag corresponding to the descriptor table which specifies the processing to be executed ((2) in FIG. 4). Then, the descriptor table corresponding to the set flag is given from the descriptor table storage part 1470 to the corresponding descriptor controllers 1420 ((3) in FIG. 4).

The descriptor controllers 1420 give commands to the DMA cores 1401 and 1402 and/or the DMA core 1440 sequentially according to a predefined descriptor table in response to a trigger from the arithmetic processing part 110 (the processor 112) ((4) in FIG. 4).

In the IO refresh processing, one or a plurality of commands for instructing issuance of the IO refresh frame and the like are given to the DMA core 1440. According to these commands, the DMA core 1440 activates communication of the communication circuit 130, and the IO refresh frame is sent out from the communication circuit 130 ((5) in FIG. 4).

The IO refresh frame sent out from the communication circuit 130 cycles through the local bus (a first local bus 21 or a second local bus 22), whereby the IO refresh processing is executed ((6) in FIG. 4). In this way, the input data 134 stored in the buffer 132 of the communication circuit 130 is updated.

Then, by data access by the DMA core 1401 and the DMA core 1440, the input data 134 stored in the buffer 132 of the communication circuit 130 is transferred to the main memory 114 of the arithmetic processing part 110, and the output data stored in the main memory 114 of the arithmetic processing part 110 is transferred to the buffer 132 of the communication circuit 130 ((7) in FIG. 4).

The IO refresh processing using the control circuit 140 is completed by the above-described processing procedure. As described above, the timing of the activation request from the arithmetic processing part 110 to the communication circuit 130 is managed by the high precision timer 160, and an environment is prepared in which processing by the DMA core set with a high priority can be executed without being impeded by processing by the DMA core set with a low priority. Therefore, the input data and the output data stored in the buffer 132 of the communication circuit 130 and the input data and the output data stored in the main memory 114 of the arithmetic processing part 110 can be synchronized.

Although FIG. 4 illustrates the configuration using the descriptor table storage part 1470 and the descriptor activation register 1472 as an example, substantially the same processing procedure is performed even in a configuration in which descriptor tables are stored in the main memory 114.

<E. Data Structures of the Descriptor Tables>

Next, an example of data structures of the descriptor tables will be described.

Figure 5:
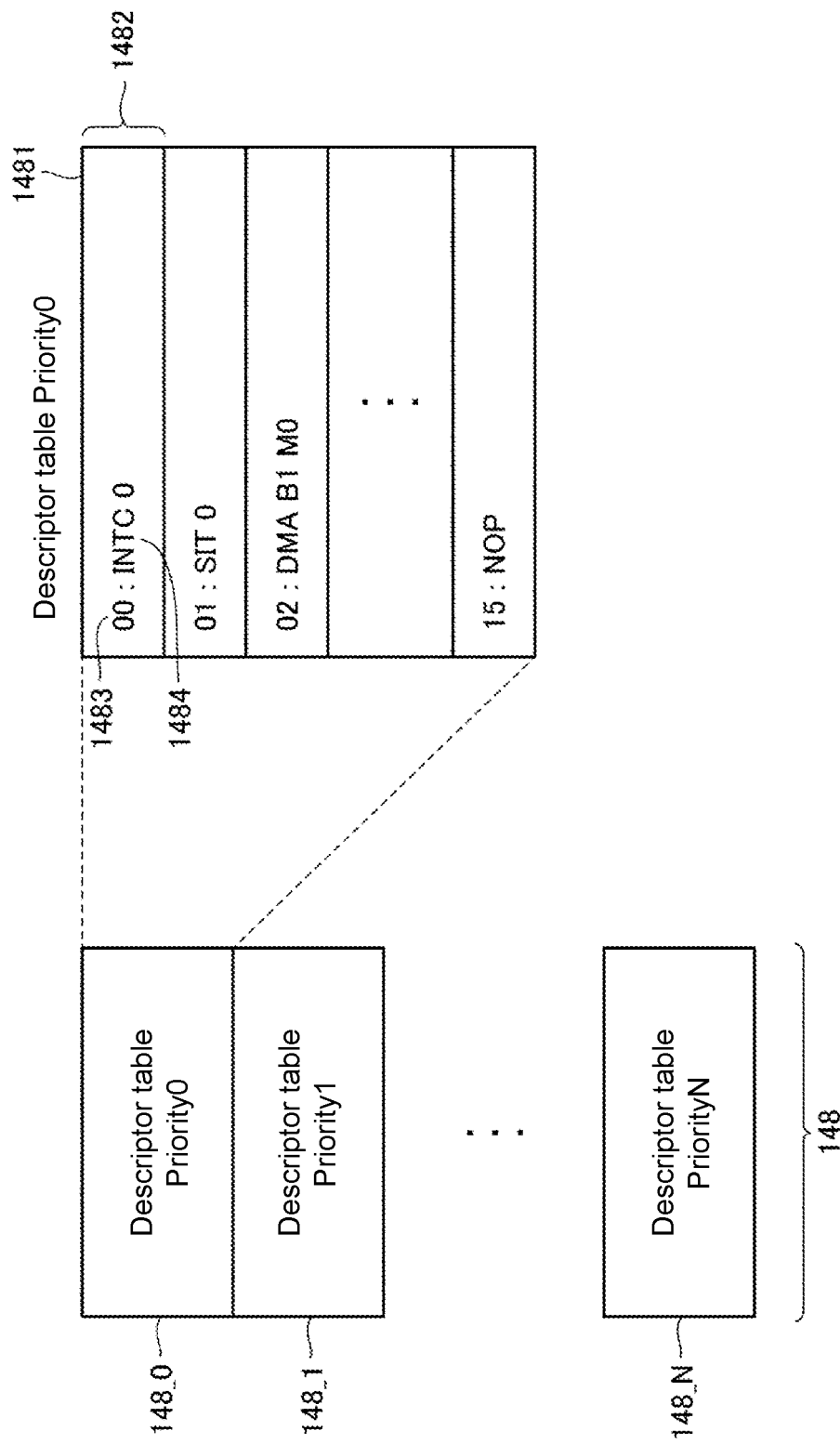
FIG. 5 is a schematic diagram showing an example of data structures of the descriptor tables used in the PLC according to Embodiment 1.

FIG. 5 is a schematic diagram showing an example of data structures of the descriptor tables used in the PLC 1 according to Embodiment 1. With reference to FIG. 5, in the PLC 1 according to Embodiment 1, descriptor tables 148_0 to 148_N (hereinafter also collectively referred to as the "descriptor tables 148") given with priorities are used. Each of the descriptor tables 148 is configured by one or a plurality of commands 1482, and processing is executed by the DMA cores in accordance with the commands 1482 described in the descriptor tables 148. Each of the commands 1482 is configured by a combination of a command number 1483 and an order 1484. The order 1484 may use assembler or machine language that can be interpreted by the DMA cores.

<F. Activation and Storage of the Descriptor Tables>

Next, an example of an activation method in the case of executing processing by the DMA cores according to the descriptor tables 148 and a storage method of the descriptor tables 148 will be described.

Figure 6:
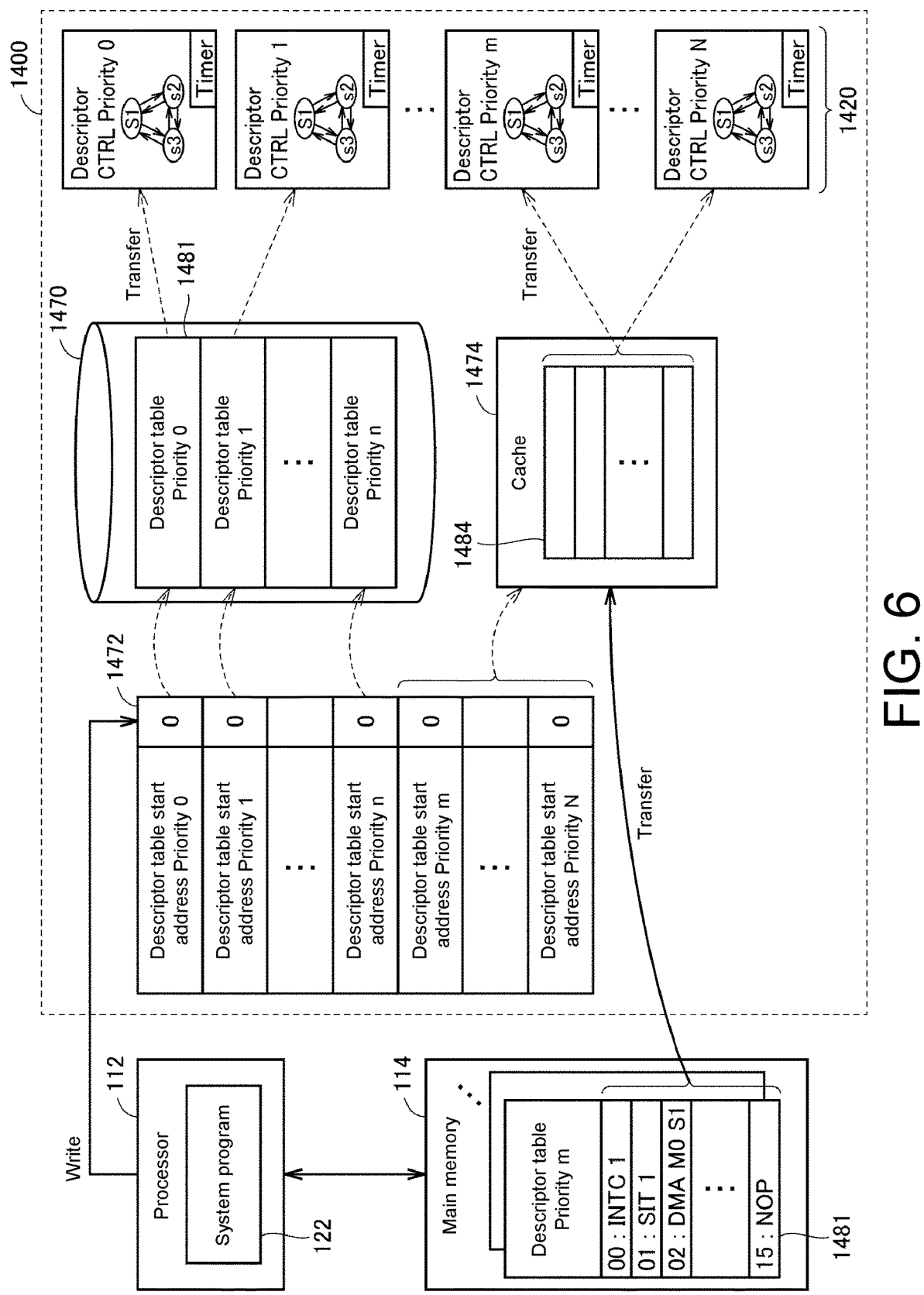
FIG. 6 is a schematic diagram for illustrating the activation and storage of the descriptor tables in the PLC according to Embodiment 1.

FIG. 6 is a schematic diagram for illustrating the activation and storage of the descriptor tables 148 in the PLC 1 according to Embodiment 1. With reference to FIG. 6, for the descriptor tables 148, it is possible to adopt (1) a method in which the descriptor tables 148 are stored in the descriptor table storage part 1470 of the processing engine 1400 and transferred to the descriptor controllers 1420 and (2) a method in which the descriptor tables 148 are stored in the main memory 114 and transferred to the descriptor controllers 1420 via the command cache 1474 of the processing engine 1400.

According to the activation method of (1), it is possible to shorten the time from when the activation instruction is given to when the transfer of the descriptor tables to the descriptor controllers 1420 is completed. However, it is necessary to secure the capacity of the descriptor table storage part 1470.

On the other hand, according to the activation method of (2), more time is required from when the activation instruction is given to when the transfer of the descriptor tables to the descriptor controllers 1420 is completed; however, since the main memory 114 is used, there is little limitation on the capacity.

When the activation method of (1) and/or the activation method of (2) is adopted, the descriptor tables are stored in at least one of the main memory 114 of the arithmetic processing part 110 and the memory area of the control circuit (such as the descriptor table storage part 1470).

For example, in the configuration example shown in FIG. 6, only the eight descriptor tables 148 with high priorities are stored in the descriptor table storage part 1470, and the remaining eight descriptor tables 148 with low priorities are stored in the main memory 114. By adopting both activation methods as shown in FIG. 6 according to priorities, the execution speed of high-priority processing can be increased, and the cost of the CPU unit 100 can be suppressed.

At this time, each of the plurality of descriptor tables 148 may be stored in one of the main memory 114 of the CPU unit 100 and the memory area of the control circuit (such as the descriptor table storage part 1470) according to the priority of the corresponding task.

For example, the descriptor tables 148 for realizing the IO refresh processing of the primary fixed cycle task 1221 that requests high-speed processing may be stored in the descriptor table storage part 1470, and the descriptor tables 148 for realizing various processings (such as transmission processing of a message frame) of the normal fixed cycle tasks 1222 that request complex processing may be stored in the main memory 114.

The activation of each descriptor table 148 is performed by writing a flag to the descriptor activation register 1472. In the descriptor tables 148, flag areas corresponding to the number (the number of priorities) of the descriptor tables 148 available to the processing engine 1400 are prepared.

However, the disclosure is not limited to the configuration shown in FIG. 6, and all descriptor tables 148 may be stored in the descriptor table storage part 1470, or all descriptor tables 148 may be stored in the main memory 114.

More specifically, according to the specific activation method of (1), the processor 112 executes the system program 122 to set the flag of the descriptor activation register 1472 corresponding to the designated descriptor table 148 among the descriptor tables 148 stored in the descriptor table storage part 1470. In response to the setting of the flag of the descriptor activation register 1472, the corresponding descriptor table 148 is activated, and the commands of the descriptor table 148 are transferred from the descriptor table storage part 1470 to the corresponding descriptor controllers 1420.

In processing engine 1400 of the PLC 1 according to Embodiment 1, the priorities are respectively set in the plurality of descriptor tables 148, and the descriptor controllers 1420 as the transfer destinations are predetermined according to the respectively set priorities.

On the other hand, according to the specific activation method of (2), the processor 112 executes the system program 122 to set the flag of the descriptor activation register 1472 corresponding to the designated descriptor table 148 among the descriptor tables 148 stored in the descriptor table storage part 1470. In response to the setting of the flag of the descriptor activation register 1472, all or part of the commands included in the designated descriptor table 148 among the descriptor tables 148 stored in the main memory 114 are transferred to the command cache 1474 to be temporarily stored. Then, the stored commands are sequentially transferred from the command cache 1474 to the corresponding descriptor controllers 1420. If all of the commands included in the descriptor table 148 cannot be transferred to the command cache 1474 at one time, the command cache 1474 may be used like a ring buffer to sequentially store and transfer the commands.

According to the above methods, the descriptor tables 148 can be given to the DMA cores, and necessary processing can be executed.

<G. Summary>

In the CPU unit 100 according to Embodiment 1, the DMA cores of the control circuit 140 sequentially execute the processings designated in accordance with the descriptor tables, whereby various communication processings including the IO refresh processing between the CPU unit 100 (the processor 112) and the functional units 200 can be realized. By using the descriptor tables, the processor 112 can delegate processing related to communication to the control circuit 140; therefore, even in cases where the processing capability of the processor 112 is limited, where the capability of data transfer between the arithmetic processing part 110 and the communication circuit 130 is limited, and the like, the throughput of data transfer exchanged between the CPU unit 100 and the one or the plurality of functional units 200 can be improved.

2. Embodiment 2

In Embodiment 1, the configuration in which the IO refresh frames are exchanged between the CPU unit 100 and the one or the plurality of functional units 200 connected via the local bus 2 has been mainly described. However, the same scheme is applicable to the one or the plurality of functional units 200 connected via a field network.

Figure 7:
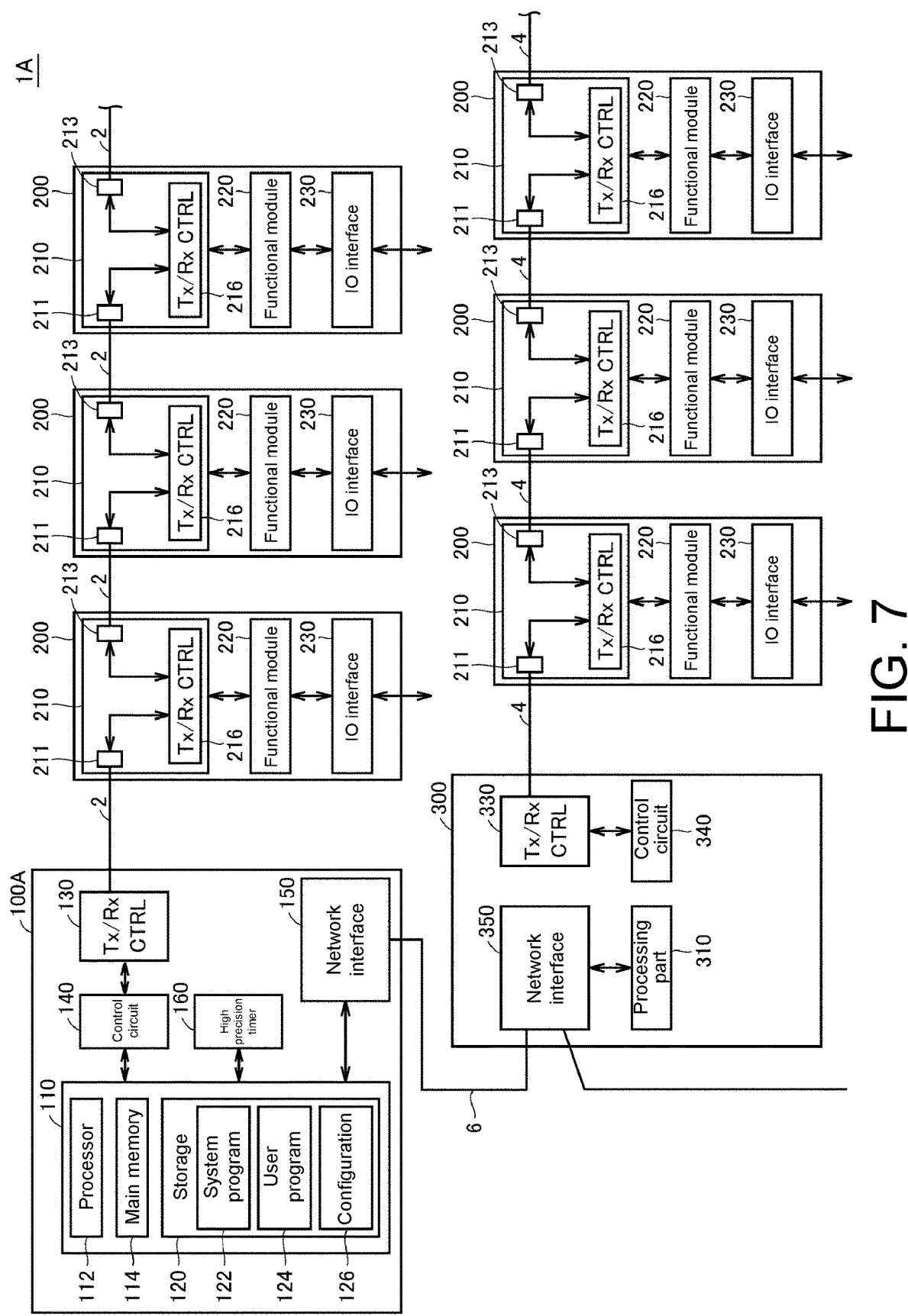
FIG. 7 is a schematic diagram showing a main configuration of a PLC according to Embodiment 2.

FIG. 7 is a schematic diagram showing a main configuration of a PLC 1A according to Embodiment 2. With reference to FIG. 7, a CPU unit 100A of the PLC 1A further includes a network interface 150 that controls a field network 6. Various devices in addition to the communication coupler unit 300 may be connected to the field network 6.

A known network such as EtherCAT (a registered trademark), EtherNet/IP (a registered trademark), DeviceNet (a registered trademark), CompoNet (a registered trademark) or the like, for example, may be adopted as the field network 6.

The communication coupler unit 300 is a relay unit for network connecting the one or the plurality of functional units 200 and the CPU unit 100A. That is, the communication coupler unit 300 also functions as a communication unit or a communication device. The communication coupler unit 300 may function as a master communication unit that manages the entire communication in a local bus 4, and each functional unit 200 may be configured to function as a slave communication unit to perform communication under the management of the communication coupler unit 300. By adopting such a master/slave configuration, timing control and the like of communication frames transferred to the local bus 4 can be easily performed. More specifically, the communication coupler unit 300 includes a processing part 310, a communication circuit 330, a control circuit 340, and a network interface 350.

The network interface 350 exchanges data with the CPU unit 100A via the field network 6 which is a communication line.

The communication circuit 330 exchanges data with the one or the plurality of functional units 200 via the local bus 4 which is a communication line. That is, the communication circuit 330 handles transmission and reception of communication frames. More specifically, the communication circuit 330 is physically connected to the local bus 4, generates an electric signal in accordance with an instruction from the control circuit 340, and transmits it onto the local bus 4; in addition, the communication circuit 330 demodulates the electric signal generated on the local bus 4 and outputs it to the processing part 310.

The controller 310 executes processing of mutually transferring data exchanged with the CPU unit 100A or other devices in the network interface 350 and data exchanged with the one or the plurality of functional units 200 in the communication circuit 330. The processing part 310, like the arithmetic processing part 110, may have a processor and a main memory.

The control circuit 340 is connected to the processing part 310 and the communication circuit 330 and has a function of mediating a request between the processing part 310 and the communication circuit 330. For example, the control circuit 340 responds to a communication request from the processor of the processing part 310 and gives an instruction to the communication circuit 330 to perform transmission or reception of data. The control circuit 340 has substantially the same functions as the control circuit 140 described above and is implemented with the function for speeding up data access such as DMA as described above and the like.

Like the CPU unit 100 according to Embodiment 1, the communication coupler unit 300 according to Embodiment 2 is implemented to have a configuration for speeding up data access such as DMA and can speed up the IO refresh processing executed between it and the functional units 200 connected via the local bus 4 even if the processor mounted in the processing part 310 has a low capacity.

Since the IO refresh processing by the communication coupler unit 300 is the same as that of the above-described Embodiment 1, detailed description will not be repeated.

By adopting a configuration like the PLC 1A according to Embodiment 2, not only can data transfer between the CPU unit and the functional units be speeded up, data transfer between the communication coupler unit and the functional units can also be speeded up. In particular, in the communication coupler unit, it is necessary to execute data transfer via the field network and data transfer via the local bus in synchronization with each other, but processor resources and data bus resources necessary for such high-speed processing can be reduced.

3. Embodiment 3

In Embodiment 3, the communication lines between the CPU unit and the one or the plurality of functional units are duplexed, whereby a configuration in which the IO refresh processing and the like can be performed at a higher speed and with more flexibility is exemplified.

<A. Device Configuration of a PLC>

Figure 8:
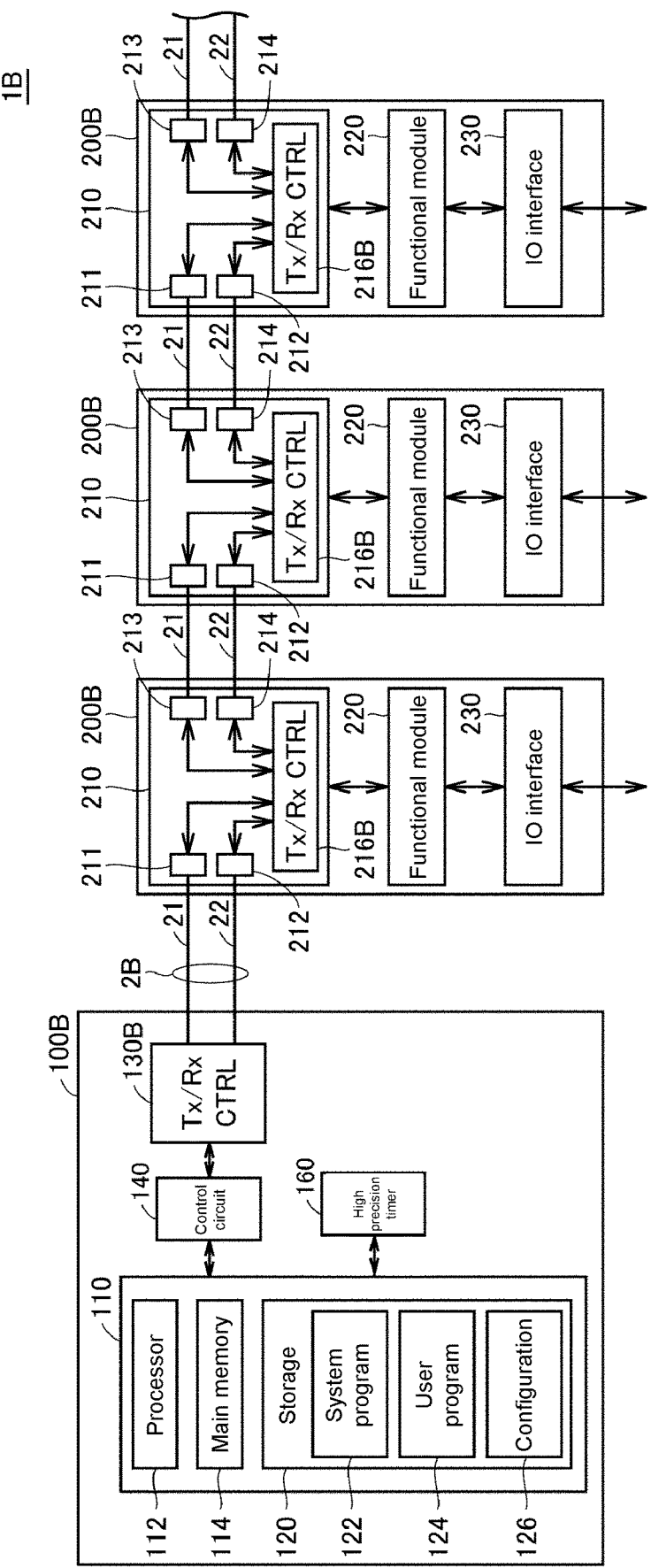
FIG. 8 is a schematic diagram showing a main configuration of a PLC according to Embodiment 3.

FIG. 8 is a schematic diagram showing a main configuration of a PLC 1B according to Embodiment 3. With reference to FIG. 8, a local bus group 2B having a plurality of channels independent of each other may be adopted between a CPU unit 100B and one or a plurality of functional units 200B of the PLC 1B. FIG. 8 shows a configuration example of connection via the local bus group 2B including a first local bus 21 and a second local bus 22 as communication lines. Although FIG. 8 illustrates a configuration adopting the local bus group 2B having two channels, any configuration having a plurality of channels independent of each other may be adopted, and a configuration having more than two channels may be adopted.

More specifically, a communication circuit 130B of the CPU unit 100B is connected to communication circuits 216B of the functional units 200B via the local bus group 2B (the first local bus 21 and the second local bus 22). In each of the functional units 200B, transmission and reception ports 211 and 212 are connected to the first local bus 21 and the second local bus 22 on the upstream side, and transmission and reception ports 213 and 214 are connected to the first local bus 21 and the second local bus 22 on the downstream side.

The communication circuits 216B of the functional units 200B allow data transfer independent of each other for the first local bus 21 and the second local bus 22, respectively.

When a local bus group having a plurality of channels as shown in FIG. 8 is used, data access by DMA and the like implemented in the control circuit 140 is adopted, whereby transmission and reception processing and transfer processing of data at a higher speed can be realized.

<B. A Plurality of IO Refresh Frames>

In the PLC 1B according to Embodiment 3, with use of the first local bus 21 and the second local bus 22 that configure the local bus group 2B, the IO refresh processing can be respectively performed independently in different cycles (constant cycles).

Figure 9:
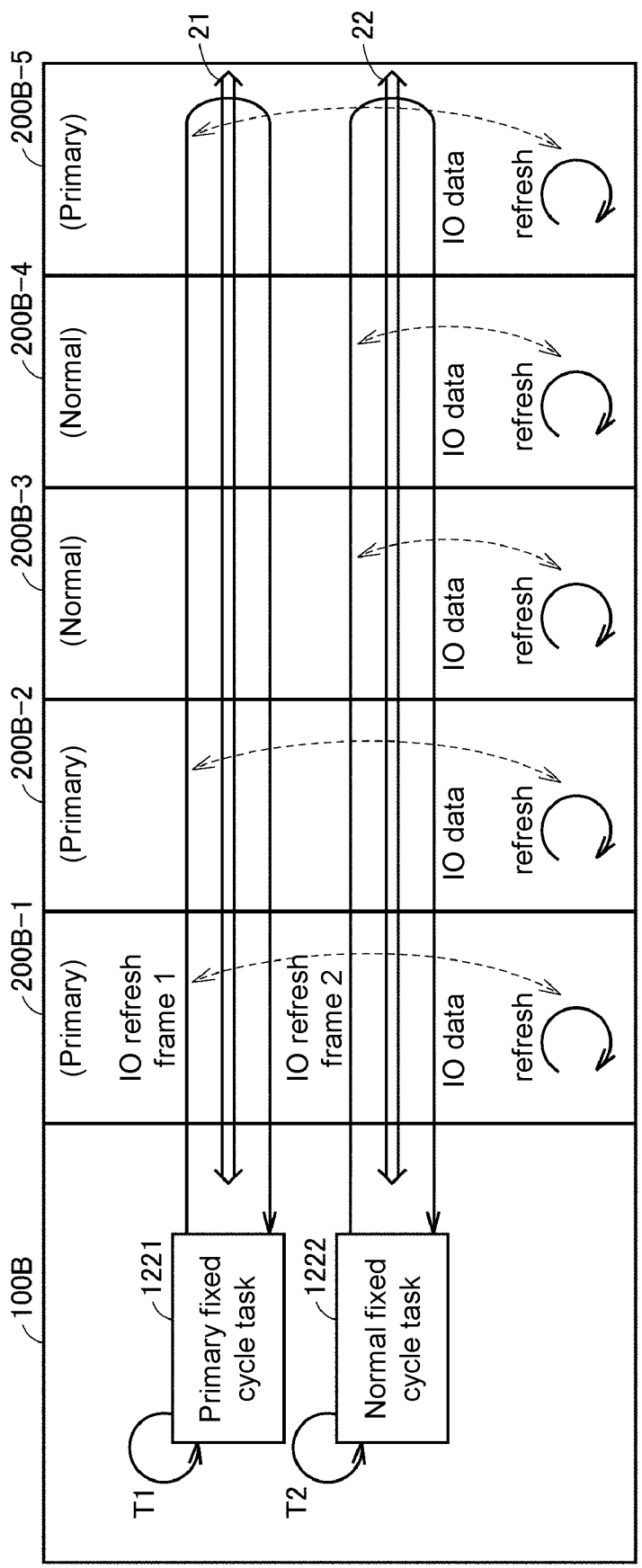
FIG. 9 is a schematic diagram for illustrating an overview of the 10 refresh processing in the PLC according to Embodiment 3.

FIG. 9 is a schematic diagram for illustrating an overview of the IO refresh processing in the PLC 1B according to Embodiment 3. With reference to FIG. 9, in the CPU unit 100B, the primary fixed cycle task 1221 (repeatedly executed at the constant cycle T1) and the normal fixed cycle task 1222 (repeatedly executed at the constant cycle T2 (>T1)) included in the system program 122 are executed. In the example shown in FIG. 9, these tasks are both tasks for realizing the IO refresh processing.

The primary fixed cycle task 1221 repeatedly sends out an IO refresh frame 1 for realizing the IO refresh onto the first local bus 21 in every constant cycle T1. That is, the primary fixed cycle task 1221 executed by the CPU unit 100B is a task of sending out, in the constant cycle T1, the IO refresh frame 1 for executing the IO refresh processing via one channel (such as the first local bus 21) in the local bus group 2B having the plurality of channels.

Further, the normal fixed cycle task 1222 repeatedly sends out an IO refresh frame 2 for realizing the IO refresh onto the second local bus 22 in every constant cycle T2. These tasks are basically executed independently of each other. That is, the normal fixed cycle task 1222 executed by the CPU unit 100B is a task of sending out, in the constant cycle T2, the IO refresh frame 2 for executing the IO refresh processing via another channel (such as the second local bus 22) in the local bus group 2B having the plurality of channels.

In addition, due to the limitation of resources of the processor 112, the primary fixed cycle task 1221 may be executed with priority over the normal fixed cycle task 1222.

Each of the functional units 200B performs transmission of the input data and acquisition of the output data using at least one of the IO refresh frame 1 and the IO refresh frame 2. In the example shown in FIG. 9, the CPU unit 100B and the functional units 200B-1 to 200B-5 are connected via the local bus group 2B.

Figure 10A:
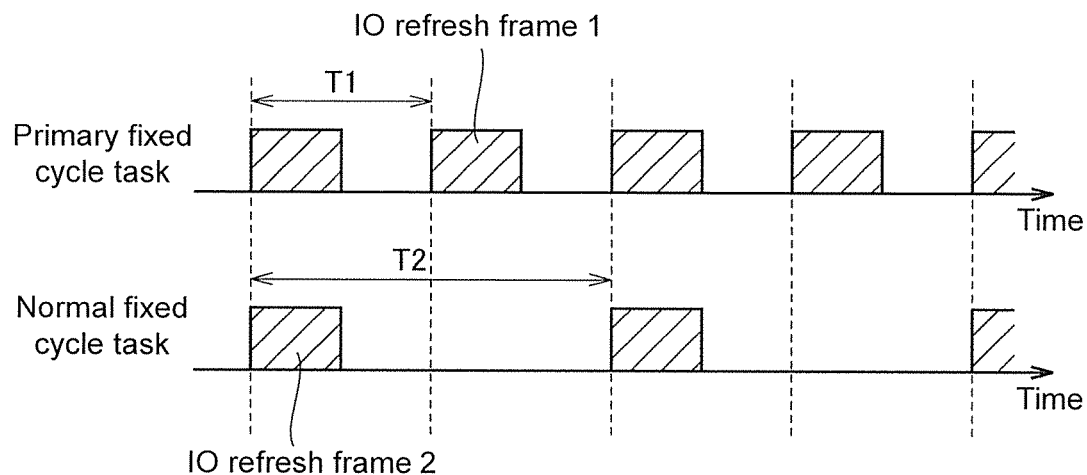
FIG. 10A and FIG. 10B are schematic diagrams for illustrating the IO refresh frames sent out by the primary fixed cycle task and the normal fixed cycle task shown in FIG. 9.
Figure 10B:
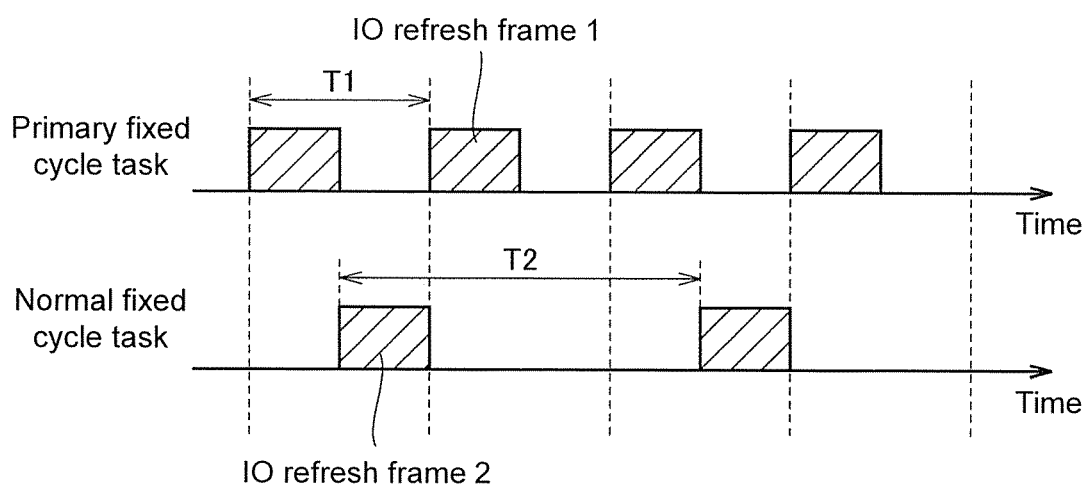

FIG. 10A and FIG. 10B are schematic diagrams for illustrating the IO refresh frames sent out by the primary fixed cycle task 1221 and the normal fixed cycle task 1222 shown in FIG. 9. FIG. 10A shows an example of a state in which the primary fixed cycle task 1221 and the normal fixed cycle task 1222 can be executed independently of each other in the processor 112. As shown in FIG. 10A, the IO refresh frame 1 is sent out from the CPU unit 100B onto the first local bus 21 in every cycle T1 in which the primary fixed cycle task 1221 is repeatedly executed. Similarly, the IO refresh frame 2 is sent out from the CPU unit 100B onto the second local bus 22 in every cycle T2 in which the normal fixed cycle task 1222 is repeatedly executed.

The IO refresh processing in each of the cycles T1 and T2 can be realized with each of the IO refresh frames.

FIG. 10B shows an example of a state in which the primary fixed cycle task 1221 and the normal fixed cycle task 1222 cannot be executed simultaneously in the processor 112. In the example shown in FIG. 10B, the primary fixed cycle task 1221 and the normal fixed cycle task 1222 execute processings in time zones that do not overlap each other. Basically, since the primary fixed cycle task 1221 is set with a higher priority than the normal fixed cycle task 1222, the primary fixed cycle task 1221 may be executed with priority if the execution timings of both tasks overlap due to the cycles or the limitation of the resources.

The IO refresh processing in each of the cycles T1 and T2 can be realized with each of the IO refresh frames in the example shown in FIG. 10B, too.

For convenience of description, FIG. 10A and FIG. 10B show an example in which the cycle T2 for repeatedly executing the normal fixed cycle task 1222 is twice the cycle T1 for repeatedly executing the primary fixed cycle task 1221, but the disclosure is not limited thereto. The cycle T1 and the cycle T2 can be set as desired independently of each other.

The IO refresh processing in each of the cycles T1 and T2 can be realized with each of the IO refresh frames in the example shown in FIG. 10(B), too.

For convenience of description, FIG. 10 shows an example in which the cycle T2 for repeatedly executing the normal fixed cycle task 1222 is twice the cycle T1 for repeatedly executing the primary fixed cycle task 1221, but the disclosure is not limited thereto. The cycle T1 and the cycle T2 can be set as desired independently of each other.

<C. Settings of the Functional Units>

With reference to FIG. 9 again, for example, the functional units 200B-1, 200B-2, and 200B-5 are associated with the primary fixed cycle task 1221, and the functional units 200B-3 and 200B-4 are associated with the normal fixed cycle task 1222.

For each of the functional units 200B, a function may be provided to provide a user interface screen for specifying which of the IO refresh frame 1 and the IO refresh frame 2 is to be associated with.

Figure 11:
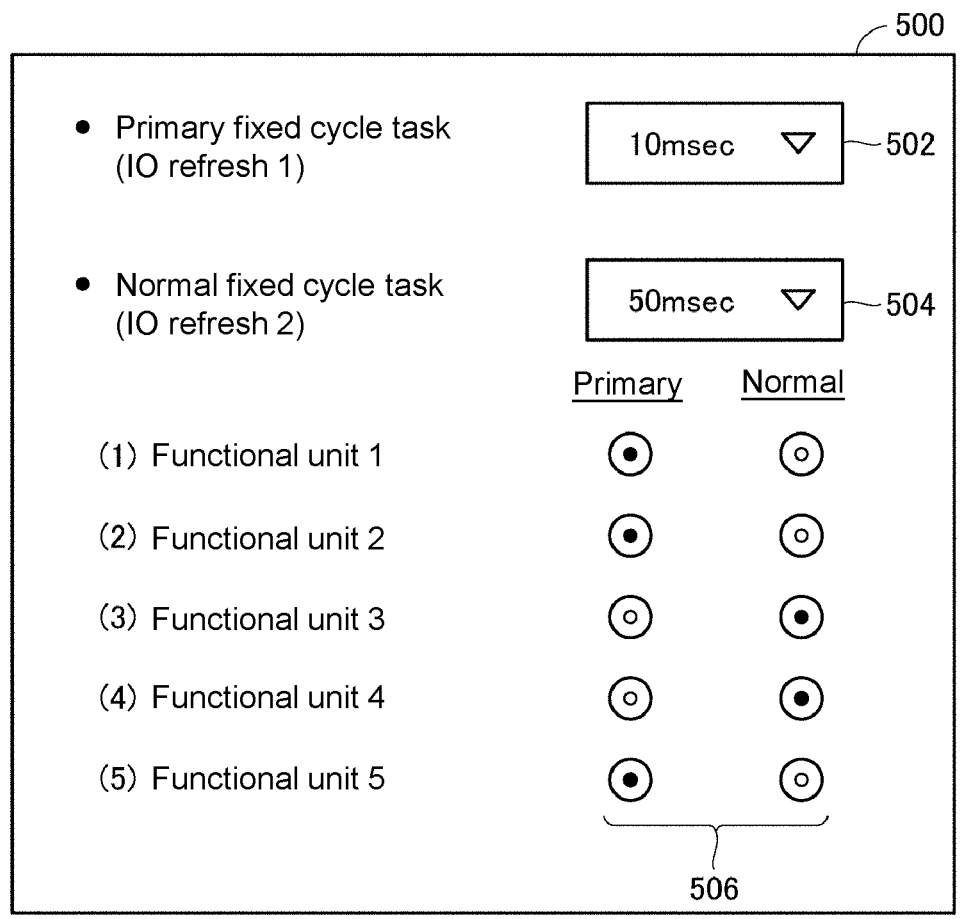
FIG. 11 is a diagram showing an example of a user interface screen for performing settings for the functional units as shown in FIG. 9.

FIG. 11 is a diagram showing an example of a user interface screen 500 for performing settings for the functional units as shown in FIG. 9. The user interface screen 500 shown in FIG. 11 may be implemented in a form such that a screen generated by a function implemented in the communication unit (the CPU unit 100B, the communication coupler unit 300 to be described later or the like) is provided on a support device; the user interface screen 500 may be configured to present the screen generated by a function implemented on the support device to the user and to transmit contents set according to the user operation to the communication unit.

With reference to FIG. 11, the user interface screen 500 includes an input item 502 for setting an execution cycle of the primary fixed cycle task 1221, an input item 504 for setting an execution cycle of the normal fixed cycle task 1222, and a radio button group 506 for performing settings for each functional unit 200B connected to the CPU unit 100B via the local bus group 2B.

The user performs operations on the input item 502 and the input item 504 of the user interface screen 500 to respectively set the cycle for repeatedly executing each fixed cycle task. Then, the user selects each radio button included in the radio button group 506 to set which of the primary fixed cycle task 1221 (i.e., the IO refresh frame 1) and the normal fixed cycle task 1222 (i.e., the IO refresh frame 2) each functional unit 200B is associated with.

The user interface screen 500 as shown in FIG. 11 is provided, whereby the user can easily perform settings for the fixed cycle tasks and each functional unit 200B.

<D. IO Refresh Frames>

Although the IO refresh frame 1 and the IO refresh frame 2 are sequentially transferred to all the functional units 200B connected to the local bus group 2B, each of the functional units 200B may be configured to process only any preset IO refresh frame.

For example, in the setting example shown in FIG. 9, when the IO refresh frame 1 sent out by the primary fixed cycle task 1221 arrives, each of the functional units 200B-1, 200B-2 and 200B-5 writes the requested input data to the IO refresh frame 1 and reads the target output data from the IO refresh frame 1. On the other hand, when the IO refresh frame 2 sent out by the normal fixed cycle task 1222 arrives, each of the functional units 200B-1, 200B-2 and 200B-5 transfers the received IO refresh frame 2 as it is to the functional unit 200B located next.

Further, when the IO refresh frame 2 sent out by the normal fixed cycle task 1222 arrives, each of the functional units 200B-3 and 200B-4 writes the requested input data to the IO refresh frame 2 and reads the target output data from the IO refresh frame 2. On the other hand, when the IO refresh frame 1 sent out by the primary fixed cycle task 1221 arrives, each of the functional units 200B-3 and 200B-4 transfers the received IO refresh frame 1 as it is to the functional unit 200B located next.

In this way, only the functional units 200B-1, 200B-2 and 200B-5 perform data writing and data reading to the IO refresh frame 1, and only the functional units 200B-3 and 200B-4 perform data writing and data reading to the IO refresh frame 2. That is, in order to perform data exchange with the communication unit (the CPU unit 100B, the communication coupler unit 300 to be described later or the like), each of the functional units 200B may process only any one of the communication frames (the IO refresh frames). In this case, each of the functional units 200B transfers the communication frame other than the communication frame to be processed for performing data exchange with the communication unit as it is.

Figure 12:
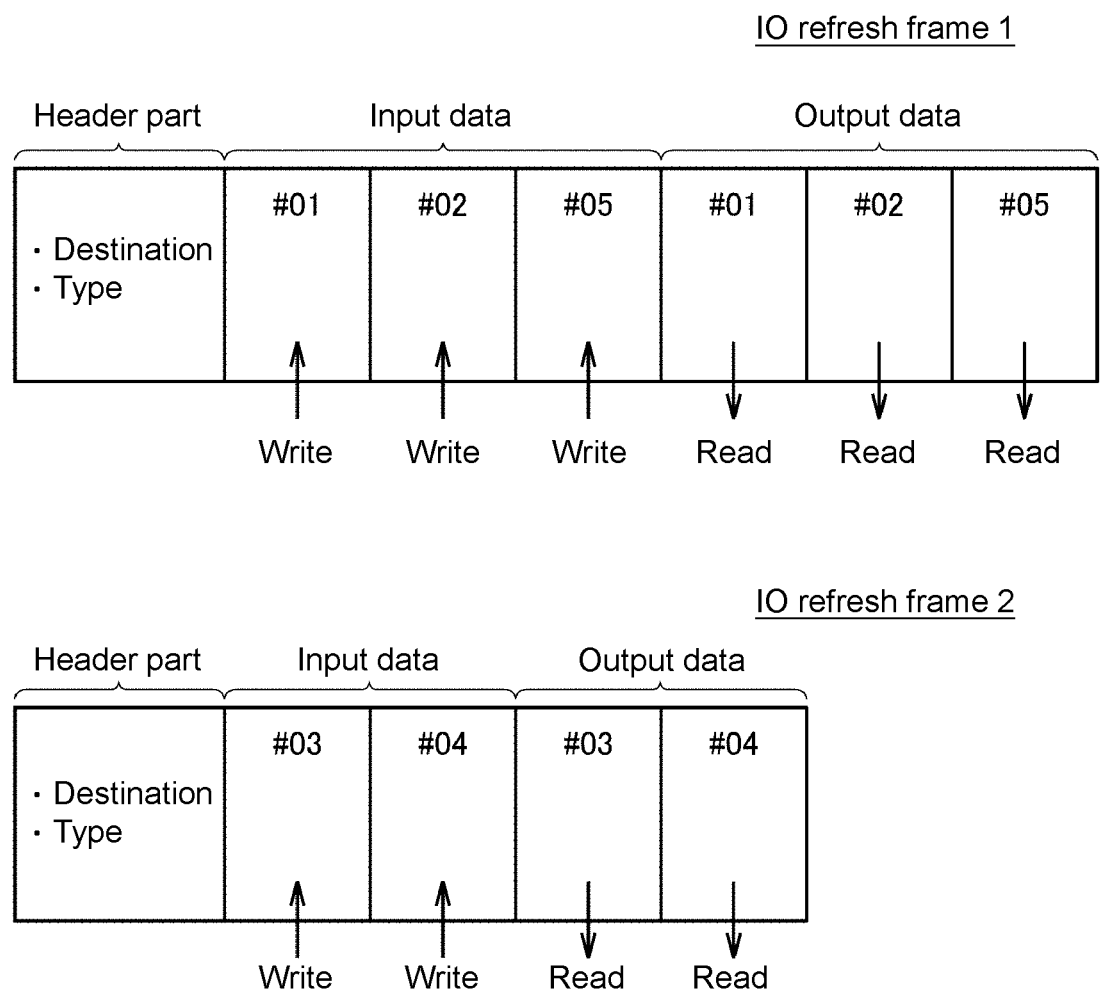
FIG. 12 is a diagram showing an example of data structures of the IO refresh frames corresponding to the settings of the functional units shown in FIG. 9.

FIG. 12 is a diagram showing an example of data structures of the IO refresh frames corresponding to the settings of the functional units 200B shown in FIG. 9. With reference to FIG. 12, the IO refresh frames 1 and 2 are configured by a header part storing a frame type and a destination, and a main part storing data.

As the frame type, identification information for specifying the type of the communication frame is used, and for example, identification information indicating which of unicast, multicast, and broadcast is used. Since the IO refresh frames 1 and 2 are sent out from the CPU unit 100B and return to the CPU unit 100B after cycling through the local bus group 2B, typically, identification information indicating multicast is stored. At this time, in transmission by multicast, a special value may be stored because a specific destination does not exist.

In the main part, areas of the input data and areas of the output data are specified, and the respective areas are determined according to setting values and the like specified by the user interface screen 500 shown in FIG. 11.

Each of the IO refresh frame 1 and the IO refresh frame 2 is provided with data areas associated with the functional units 200B that perform processing. For example, in the IO refresh frame 1 shown in FIG. 12, the areas of the input data and the areas of the output data respectively corresponding to the functional units 200B-1, 200B-2 and 200B-5 are specified. Further, in the IO refresh frame 2, the areas of the input data and the areas of the output data respectively corresponding to the functional units 200B-3 and 200B-4 are specified.

As described above, in the IO refresh frame 1 and the IO refresh frame 2, it is possible to secure only the communication capacity corresponding to the number of the functional units 200B which perform data writing and data reading. Therefore, even if the number of the functional units 200B connected to the CPU unit 100B increases, it is possible to consider only the number of the functional units 200B associated with each of the IO refresh frames, and a case in which the frame length unnecessarily increases does not occur.

Also, for example, even if the functional units 200B associated with the IO refresh frame 2 are added, since the IO refresh frame 1 is not affected, the frame length of the IO refresh frame 1 does not change, and there is no effect on the cycle of the IO refresh processing by the primary fixed cycle task 1221 and the like. Therefore, the degree of freedom in adding the functional units 200B to the CPU unit 100B can be increased.

Alternatively, a single functional unit 200B may be associated with both of the IO refresh frames 1 and 2. In this case, the areas of the input data or the output data of the corresponding functional unit 200B are set in both IO refresh frames 1 and 2, and the writing of the designated input data and/or the reading of the designated output data may be performed no matter which communication frame arrives.

Here, with reference to FIG. 9 again, the relationship between the timing at which the IO refresh frames arrive at each functional unit 200B and the timing of the collection of the field values (the input data) from the machines, the equipment or the like to be controlled and the output of the control instruction values (the output data) to the machines, the equipment or the like to be controlled (in FIG. 9, these processings are collectively referred to as the "internal refresh") in each functional unit 200B will be described.

For example, since the transmission cycle and transmission timing of the IO refresh frames are predetermined, through synchronizing the start timing of the internal refresh of each functional unit 200B with the transmission cycle of the target IO refresh frame, the CPU unit 100B can acquire the input data from each functional unit 200B in the shortest delay time. Such internal refresh in the functional units 200B may be referred to as an input/output synchronization method.

However, it is not necessary to adopt the internal refresh of the input/output synchronization method, and other refresh methods may be adopted. For example, each functional unit 200B may have timers synchronized with each other, and the timing may be determined based on values (count values) indicated by each timer. Such internal refresh may be referred to as a time stamp method. According to the time stamp method, the timing of the internal refresh of each functional unit 200B is not synchronized with the IO refresh frames, but all functional units 200B can perform the internal refresh at the same timing. As a result, even when there are a plurality of transmission cycles of the IO refresh frames, it is easy to maintain consistency between the input data and the output data.

Alternatively, if the synchronization and the like between the input data and the output data are not requested, each functional unit 200B may perform the internal refresh at its own timing or condition. Such internal refresh may be referred to as a free run method. In this case, since it is not necessary to notify the timing and the like to each of the plurality of functional units 200B, the processing can be simplified.

<E. Summary>

In the PLC 1B according to Embodiment 3, the local bus group 2B having channels independent of each other is adopted, whereby the IO refresh frames can respectively be transferred independently with use of the respective channels. In this way, each functional unit 200B can perform the IO refresh processing with a more preferable IO refresh frame according to the characteristics and applications of the input data and the output data handled by each functional unit 200B.

Through using a plurality of IO refresh frames by the respective channels, as compared with the case of using a single IO refresh frame, an efficient transfer of the input data and the output data becomes possible, and a situation in which the frame length of the IO refresh frame increases and the IO refresh cycle extends can be avoided.

4. Modified Example of Embodiment 3

Regarding the configuration adopting the local bus group 2B having the plurality of channels independent of each other as shown in the PLC 1B according to Embodiment 3, it may be adopted in the PLC 1A according to Embodiment 2 shown in FIG. 7 as a local bus group for connecting the communication unit and the one or the plurality of functional units. By adopting such a configuration, the data transfer by the communication coupler unit 300 can also be further speeded up.

5. Summary

In the CPU unit configuring the PLC according to the embodiment, the control circuit 140 is disposed between the arithmetic processing part 110, which includes the processor 112, the main memory 114 and the like for executing tasks, and the communication circuit 130 which handles communication via the local bus. The control circuit 140 has the plurality of DMA cores, and each DMA core sequentially executes the processing designated in accordance with the descriptor tables. In this way, various communication processings, such as the IO refresh processing between the CPU unit 100 (the processor 112) and the functional units 200, including data transfer between the arithmetic processing part 110 and the communication circuit 130, can be realized at a high speed. In particular, since the processor 112 of the arithmetic processing part 110 can delegate the processing related to communication to the control circuit 140 by using the descriptor tables, an efficient data transfer can be realized even when the processing resources of the processor 112 are few.

Further, the control circuit 140 configuring the PLC according to the embodiment is suitable for a case where the communication capacity of the communication line connecting the CPU unit 100 and the one or the plurality of functional units 200 is increased, a case where the communication capacity in the CPU unit 100 is rate-limited and the throughput cannot be improved, and the like.

The embodiments disclosed herein are exemplary and should not be construed restrictive in all aspects. The scope of the disclosure is defined by the claims instead of the above descriptions, and it is intended to include the equivalent of the scope of the claims and all modifications within the scope.

What is claimed is:

1. A control device, comprising:
a communication unit;
one or a plurality of functional units; and
a communication line that has a plurality of channels independent of each other and connects the communication unit and the one or the plurality of functional units,
wherein the communication unit comprises:
an arithmetic processing part in which a processor executes one or a plurality of tasks;
a communication circuit that handles transmission and reception of communication frames via the communication line; and
a control circuit connected to the arithmetic processing part and the communication circuit,
wherein the control circuit comprises:
a first direct memory access (DMA) core for accessing the arithmetic processing part;
a second DMA core for accessing the communication circuit; and
a controller that gives commands to the first DMA core and the second DMA core sequentially according to a predefined descriptor table in response to a trigger from the arithmetic processing part; and
an activation unit configured to selectively activate a descriptor table designated from among a plurality of descriptor tables set with priorities different from each other in advance, wherein
in the arithmetic processing part, a plurality of tasks set with the priorities different from each other are executed, and
the communication unit is configured to execute
a first task of sending out, in a first cycle, a first communication frame for executing at least one of transmission of data collected by the functional units to the communication unit and transmission of data held by the communication unit to the functional units via a first channel among the plurality of channels and
a second task of sending out, in a second cycle different from the first cycle, a second communication frame for executing at least one of transmission of the data collected by the functional units to the communication unit and transmission of the data held by the communication unit to the functional units via a second channel among the plurality of channels, wherein the first task and the second task are among the plurality of tasks, and a priority of the first task is higher than a priority of the second task,
each of the plurality of descriptor tables is stored in the memory of the arithmetic processing part or the memory area of the control circuit according to a priority of the corresponding task, and
a descriptor table corresponding to the first task is stored in the memory area of the control circuit and a descriptor table corresponding to the second task is stored in the memory of the arithmetic processing part.

2. The control device according to claim 1, wherein the control circuit further comprises an arbiter configured to arbitrate based on the priorities set in each of the descriptor tables when processings according to different descriptor tables are simultaneously requested.

3. The control device according to claim 1, wherein each of the one or the plurality of functional units processes only any one of the communication frames in order to perform data exchange with the communication unit.

4. A communication device connected to one or a plurality of functional units via a communication line having a plurality of channels independent of each other, the communication device comprising:
an arithmetic processing part in which a processor executes one or a plurality of tasks;
a communication circuit that handles transmission and reception of communication frames via the communication line; and
a control circuit connected to the arithmetic processing part and the communication circuit,
wherein the control circuit comprises:
a first direct memory access (DMA) core for accessing the arithmetic processing part;
a second DMA core for accessing the communication circuit; and
a controller that gives commands to the first DMA core and the second DMA core sequentially according to a predefined descriptor table in response to a trigger from the arithmetic processing part; and
an activation unit configured to selectively activate a descriptor table designated from among a plurality of descriptor tables set with priorities different from each other in advance, wherein in the arithmetic processing part, a plurality of tasks set with the priorities different from each other are executed, and, wherein the communication device is configured to execute a first task of sending out, in a first cycle, a first communication frame for executing at least one of transmission of data collected by the functional units to the communication device and transmission of data held by the communication device to the functional units via a first channel among the plurality of channels and a second task of sending out, in a second cycle different from the first cycle, a second communication frame for executing at least one of transmission of the data collected by the functional units to the communication device and transmission of the data held by the communication device to the functional units via a second channel among the plurality of channels, wherein the first task and the second task are among the plurality of tasks, and a priority of the first task is higher than a priority of the second task, each of the plurality of descriptor tables is stored in the memory of the arithmetic processing part or the memory area of the control circuit according to a priority of the corresponding task, and a descriptor table corresponding to the first task is stored in the memory area of the control circuit and a descriptor table corresponding to the second task is stored in the memory of the arithmetic processing part.

\* \* \* \* \*